(12) United States Patent
Tao et al.

(10) Patent No.: US 10,976,153 B1
(45) Date of Patent: Apr. 13, 2021

(54) FORMING TOOL DETECTION APPARATUS

(71) Applicant: TCTM (HONG KONG) LIMITED, Hong Kong (CN)

(72) Inventors: Chia-Li Tao, Hong Kong (CN); Chien-Hung Fan, Hong Kong (CN)

(73) Assignee: TCTM (HONG KONG) LIMITED, Tsuen Wan (HK)

( * ) Notice: Subject to any disclaimer, the term of this patent is extended or adjusted under 35 U.S.C. 154(b) by 0 days.

(21) Appl. No.: 16/748,652

(22) Filed: Jan. 21, 2020

(51) Int. Cl.
*G01B 11/24* (2006.01)
*G01B 11/02* (2006.01)
*G01B 11/08* (2006.01)
*B22F 5/00* (2006.01)

(52) U.S. Cl.
CPC .............. *G01B 11/02* (2013.01); *G01B 11/08* (2013.01); *B22F 2005/001* (2013.01); *B23B 2260/128* (2013.01)

(58) Field of Classification Search
CPC ........... G01N 2021/8822; G01N 21/88; G01B 11/14; G01B 11/06; G01B 11/04; G01B 11/02; G01B 11/0625; G01B 11/08; G01B 11/2425; G01B 11/2433; G01B 21/08; G01B 2210/44; G01B 2210/283; G01B 7/06; G01B 7/12; G01B 7/28; G01B 7/34
USPC .... 356/237.1–237.5, 601–636, 240.1, 239.7, 356/239.8, 430, 638; 250/559.19, 223 B, 250/559.24
See application file for complete search history.

(56) References Cited

U.S. PATENT DOCUMENTS

| | | | | |
|---|---|---|---|---|
| 3,870,890 | A * | 3/1975 | Binks | G01B 11/105 250/559.24 |
| 4,409,475 | A * | 10/1983 | Zehnpfennig | G02B 27/46 250/224 |
| 5,457,537 | A * | 10/1995 | Richter | G01B 11/02 356/625 |
| 5,936,725 | A * | 8/1999 | Pike | G01B 11/08 348/125 |
| 6,292,262 | B1 * | 9/2001 | Ciani | G01B 11/14 356/505 |
| 7,408,653 | B1 * | 8/2008 | LaCarrubba | F41G 7/005 250/252.1 |
| 2009/0051933 | A1 * | 2/2009 | Stimpson | G01B 11/024 356/614 |
| 2016/0025644 | A1 * | 1/2016 | Nygaard | G01B 11/2433 356/625 |

* cited by examiner

*Primary Examiner* — Hoa Q Pham

(57) ABSTRACT

A forming tool detection device includes a reflector module, an image sensor and a backlight module respectively disposed on both sides of the reflector module with a detection space formed between the backlight module and the reflector module for the insertion of a forming tool for detection. The reflector module focuses the light projected by the backlight module and reflects the focused light toward the backlight module and is provided with a hollow portion for the image sensor to capture an image of the forming tool. The reflector module is used to reflect the light emitted by the backlight module so that the tool image captured by the image sensor can detect the length and outer diameter of the forming tool, thereby simplifying the tool detection process.

2 Claims, 5 Drawing Sheets

FORMING TOOL DETECTION APPARATUS

BACKGROUND OF THE INVENTION

1. Field of the Invention

The present invention relates to cutter detection technology and more particularly, to a forming tool detection apparatus, which uses the focus reflection of a light source to detect both the contour and the surface of a forming tool.

2. Description of the Related Art

Forming tools refer to drill bits or milling cutters, etc., for drilling or milling of objects. Due to the automation of the production of forming tools and the increased requirements for the processing accuracy of objects, the forming tools need to undergo a series of tests to confirm the length and outer diameter when they are manufactured or recycled. When using an image sensor to detect the outer diameter of a forming tool, the light source must be a backlight source, that is, the light source and the image sensor are on different sides of the forming tool. However, when using the image sensor to detect the length of the forming tool, the light source and the image sensor need to be on the same side of the forming tool, so the detection process is complicated.

SUMMARY OF THE INVENTION

The present invention has been accomplished under the circumstances in view. It is therefore the main object of the present invention to provide a forming tool detection apparatus, which uses a reflector module to reflect the light emitted by a backlight module so that the tool image captured by an image sensor can detect the length and outer diameter of the forming tool, thereby simplifying the tool detection process.

To achieve this and other objects of the present invention, a forming tool detection apparatus comprises an image sensor, a reflector module and a backlight module. The image sensor and the backlight module are respectively disposed on both sides of the reflector module, so that a detection space is formed between the backlight module and the reflector module for the insertion of a forming tool for detection. The backlight module projects light toward the reflector module. The reflector module focuses the light projected by the backlight module and reflects the focused light toward the backlight module and is provided with a hollow portion for the image sensor to capture an image of the forming tool in the detection space.

Preferably, the forming tool detection apparatus further comprises an adjustment module. The adjustment module comprises a base, a lifting seat, a rail mount, a focal length adjustment mount holding the image sensor and a focus adjustment mount holding the reflector module. The lifting seat is connected to the base and vertically movable relative to the base. The rail mount is connected to the lifting seat. The focal length adjustment mount and the focus adjustment mount are connected to the rail mount transversely movable relative to the rail mount.

Preferably, the reflector module comprises a locating block connected to the focus adjustment mount, and an arc-shaped focusing lens provided on the locating block to face toward the backlight module. Furthermore, the hollow portion cuts through the locating block and the arc-shaped focusing lens.

DETAILED DESCRIPTION OF THE PREFERRED EMBODIMENT

Figure 1:
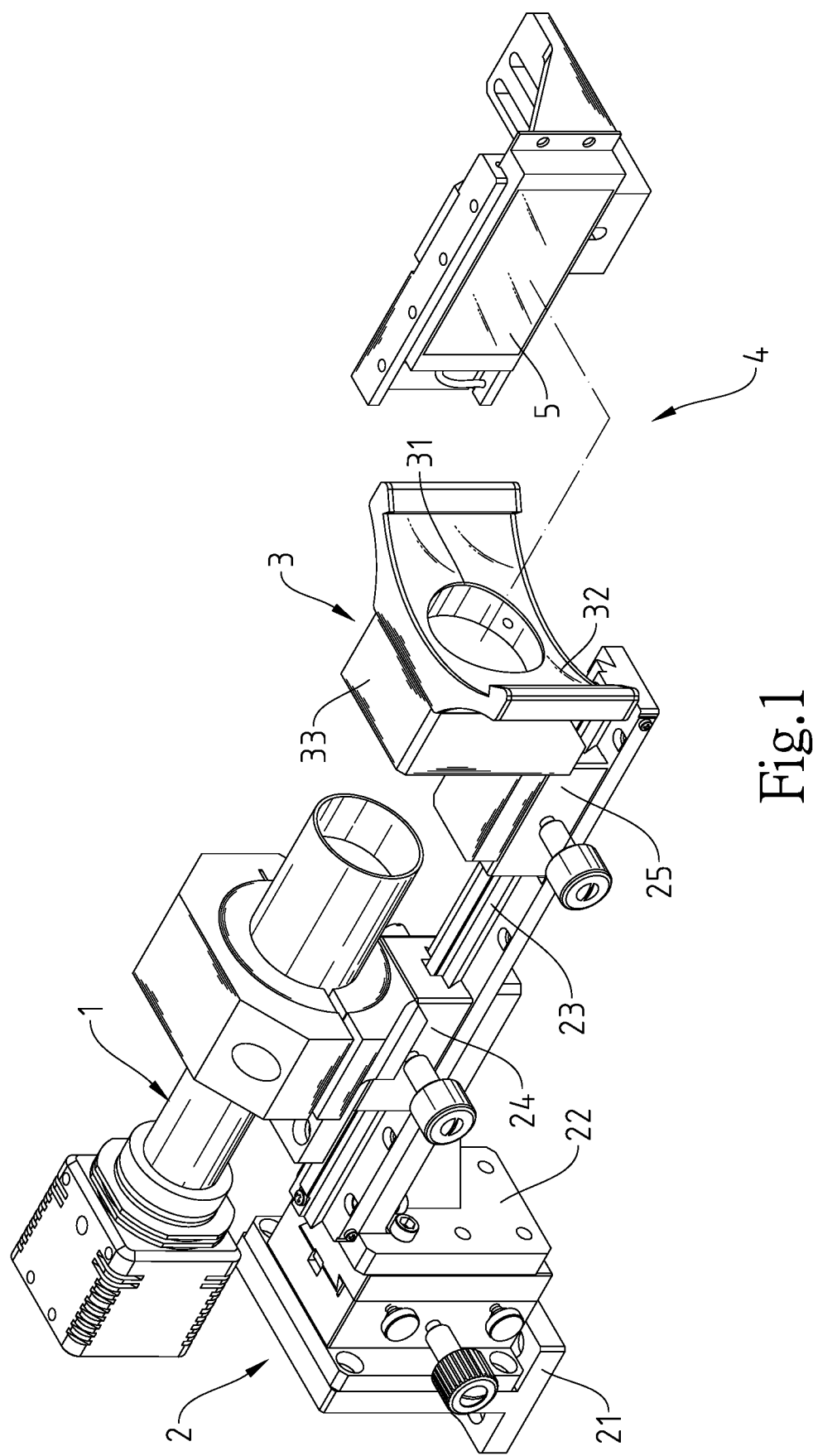
FIG. 1 is an elevational view of a forming tool detection apparatus in accordance with the present invention.
Figure 2:
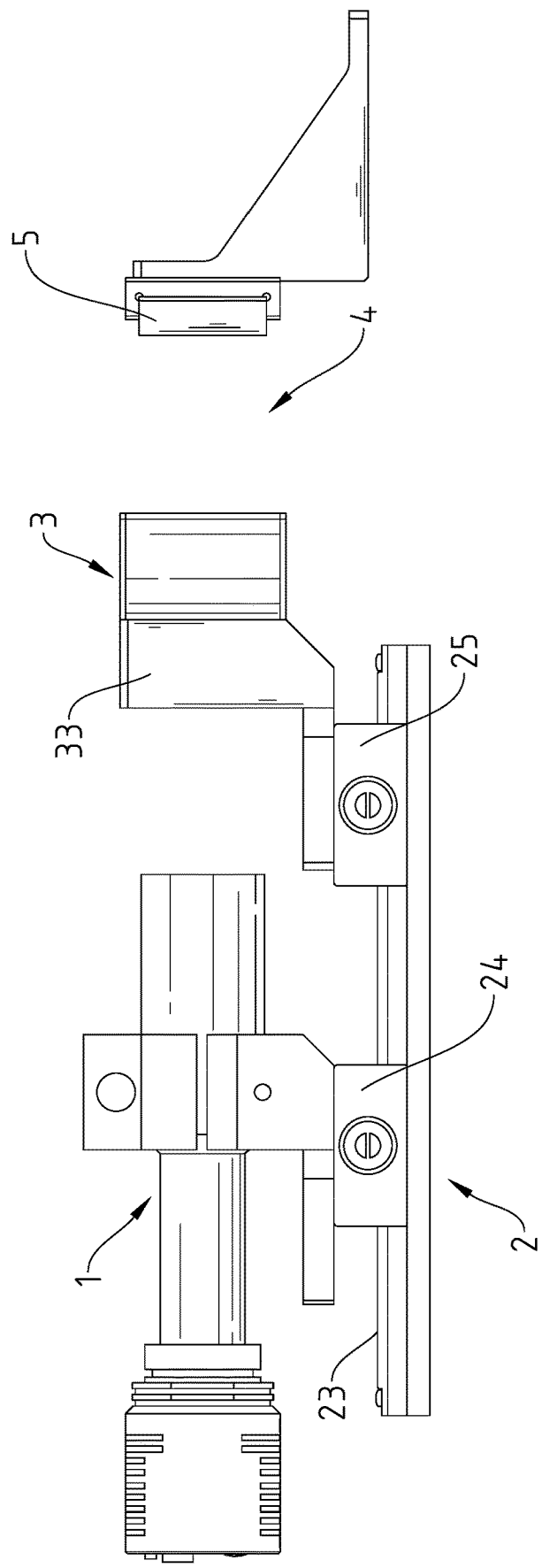
FIG. 2 is a front view of the forming tool detection apparatus in accordance with the present invention.
Figure 3:
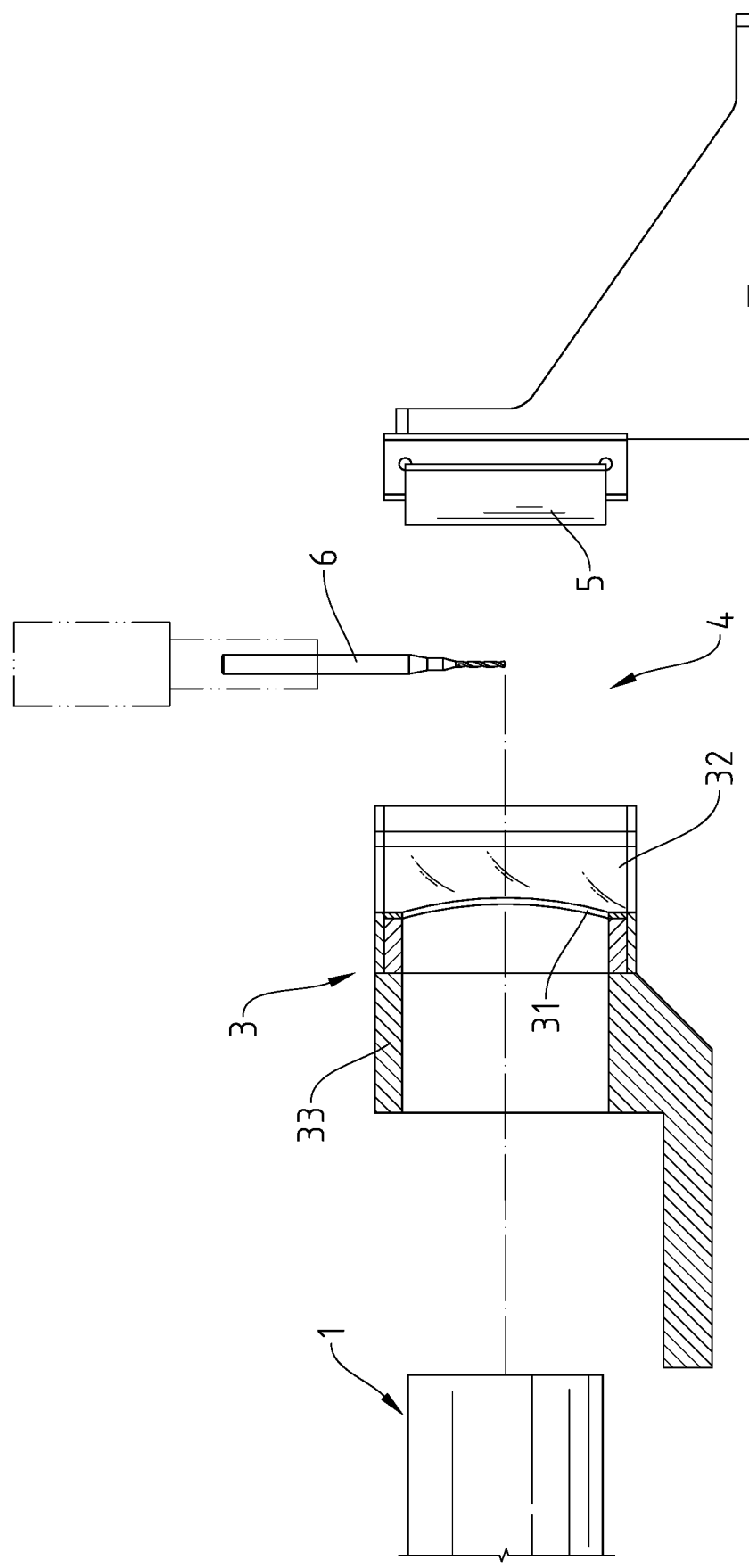
FIG. 3 is a schematic applied view of the forming tool detection apparatus in accordance with the present invention.

Referring to FIGS. 1-3, a forming tool detection apparatus in accordance with the present invention is shown. The forming tool detection apparatus comprises an image sensor 1, an adjustment module 2, a reflector module 3 and a backlight module 5.

The image sensor 1 and the backlight module 5 are respectively disposed on both sides of the reflector module 3, so that a detection space 4 is formed between the backlight module 5 and the reflector module 3 for the insertion of a forming tool 6 for detection.

The backlight module 5 projects light toward the reflector module 3, and the reflector module 3 focuses the light projected by the backlight module 5 and reflects it toward the backlight module 5. The reflector module 3 is provided with a hollow portion 31 for the image sensor 1 to capture an image of the forming tool 6 in the detection space 4.

The adjustment module 2 comprises a base 21, a lifting seat 22, a rail mount 23, a focal length adjustment mount 24, and a focus adjustment mount 25. The lifting seat 22 is connected to the base 21 and can be vertically displaced relative to the base 21. The rail mount 23 is connected to the lifting seat 22. The focal length adjustment mount 24 and the focus adjustment mount 25 are connected to the rail mount 23 and can be transversely displaced relative to the rail mount 23.

The image sensor 1 and the reflector module 3 are respectively connected to the focal length adjustment mount 24 and the focus adjustment mount 25. The reflector module 3 comprises a locating block 33 connected to the focus adjustment mount 25, and an arc-shaped focusing lens 32 provided on the locating block 33 to face toward the backlight module 5. The hollow portion 31 cuts through the locating block 33 and the arc-shaped focusing lens 32.

Figure 4:
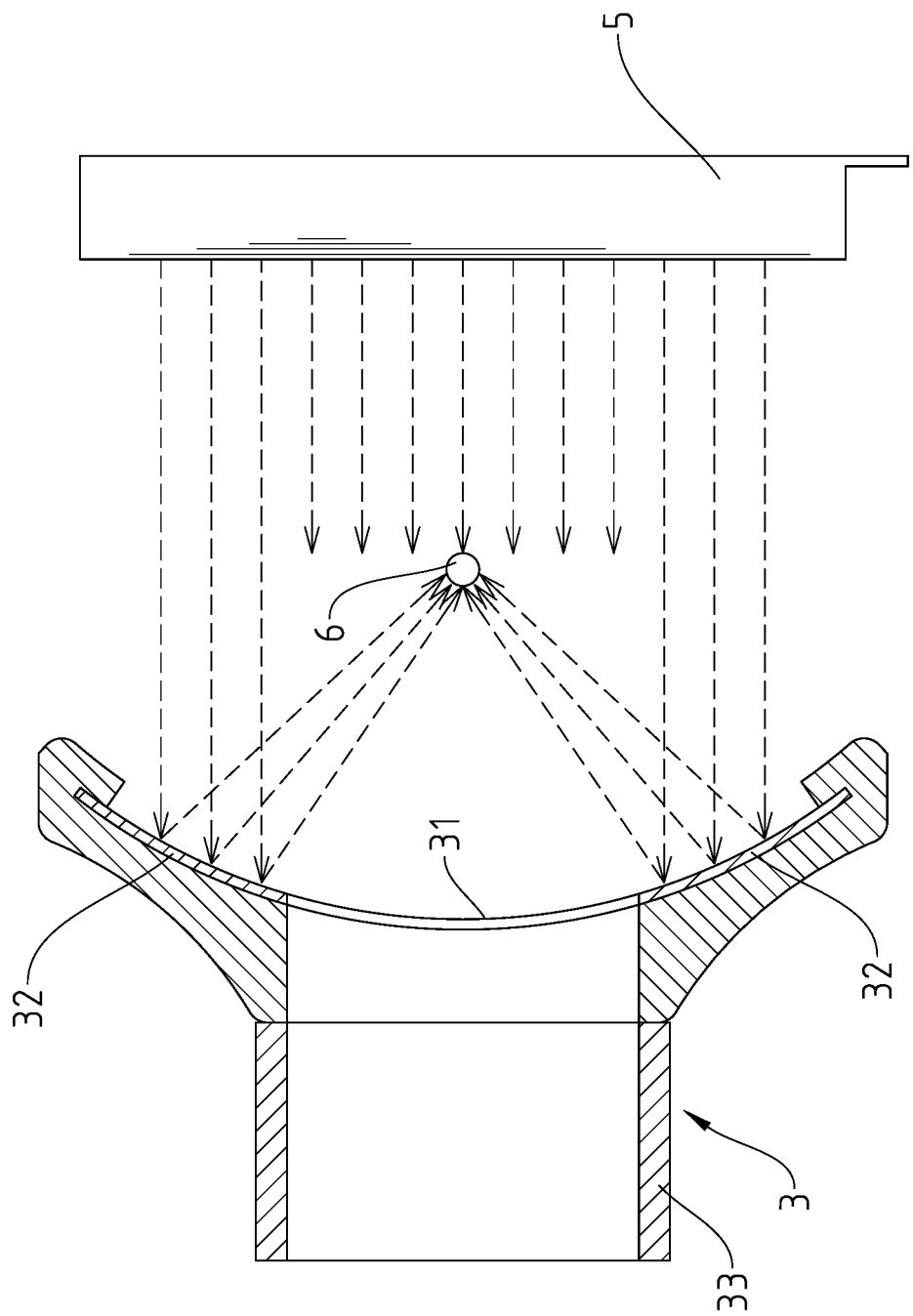
FIG. 4 is a schematic drawing of the present invention, showing the backlight module reflected the light onto the arc-shaped focusing lens and the arc-shaped focusing lens refracted the light onto the forming tool.
Figure 5:
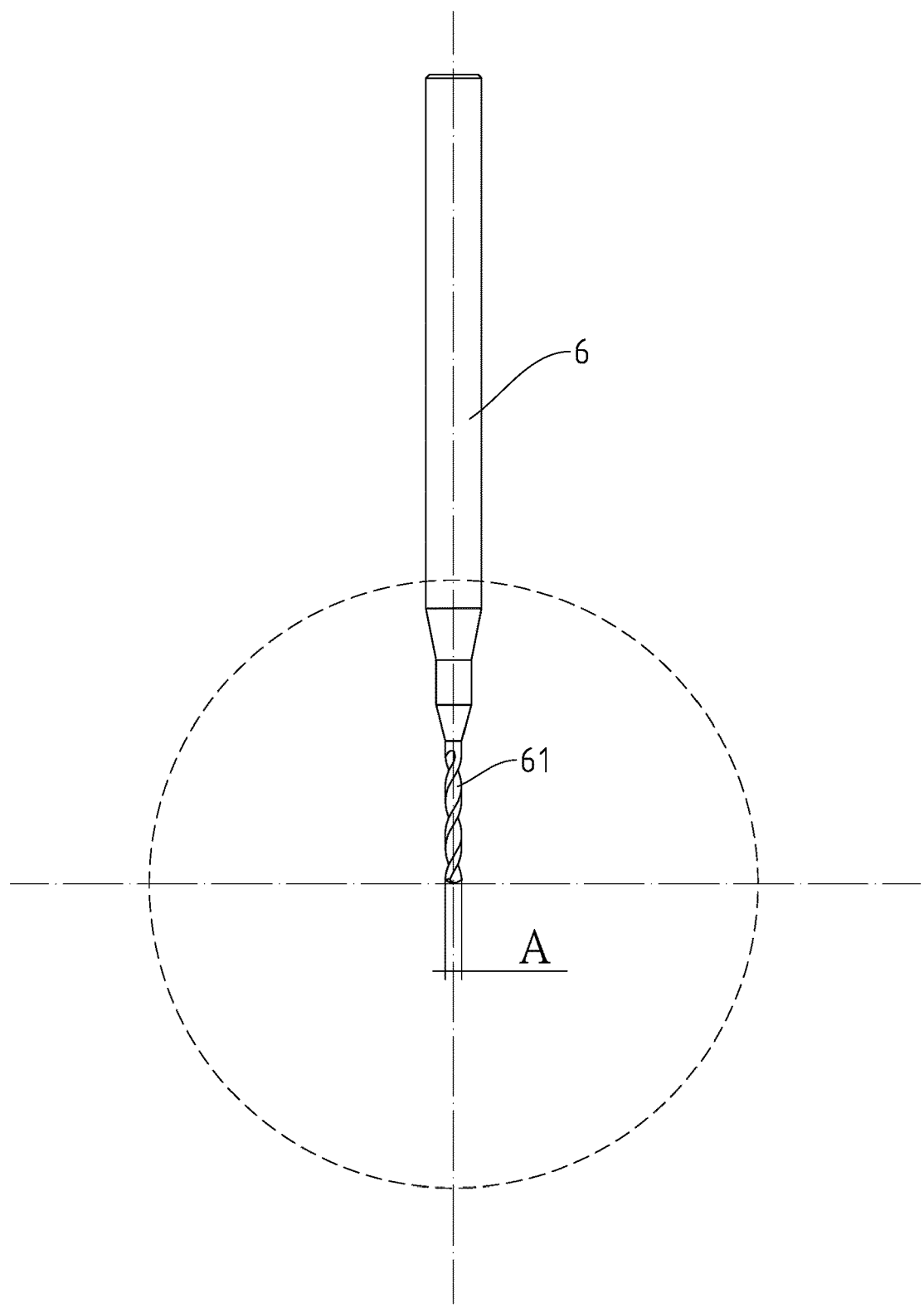
FIG. 5 is a schematic drawing showing the detection of the outer diameter of the forming tool.

Referring to FIGS. 1-5, when detecting the forming tool 6, as shown in FIG. 4, place the forming tool 6 in the detection space 4, then activate the backlight module 5 to emit light, enabling the arc-shaped focusing lens 32 of the reflector module 3 to focus the light emitted by the backlight module 5 and to project the focused light onto the surface of the forming tool 6 that faces toward the reflector module 3, so that the image of the forming tool 6 captured by the image sensor 1 can be used to clearly determine the outer diameter A of the forming tool 6 through the light source projected by the backlight module 5 toward the reflector module 3. The light source focused by the arc-shaped focusing lens 32 can make the chipping groove 61 on the surface of forming tool 6 clearly visible, so that the length of the forming tool 6 can be judged. Furthermore, the user can adjust the height of the image sensor 1 and the reflector module 3 through the lifting seat 22 of the adjustment module 2, and can also use the focal length adjustment mount 24 and the focus adjustment mount 25 to adjust the focal length of the image sensor 1 and the focal position of the reflector module 3, making the image of the forming tool 6 captured by the image sensor 1 more clear.

What is claimed is:

1. A forming tool detection apparatus, comprising an image sensor, a reflector and a backlight, wherein:
    said image sensor and said backlight are respectively disposed on opposite sides of said reflector, so that a detection space is formed between said backlight and said reflector for insertion of a forming tool for detection;
    wherein:
    said backlight is configured to project light toward said reflector;
    said reflector is configured to focus the light projected by said backlight and reflect the focused light toward said detection space, the reflector comprising a hollow portion for said image sensor to capture an image of said forming tool in said detection space;
    wherein the forming tool detection apparatus further comprises an adjustment module, the adjustment module comprising:
    a base,
    a lifting seat,
    a rail mount,
    a focal length adjustment mount holding said image sensor, and
    a focus adjustment mount holding said reflector,
    said lifting seat being connected to said base and vertically movable relative to said base, said rail mount being connected to said lifting seat, said focal length adjustment mount and said focus adjustment mount being connected to said rail mount and transversely movable relative to said rail mount.

2. The forming tool detection apparatus as claimed in claim 1, wherein said reflector further comprises a locating block connected to said focus adjustment mount, and an arc-shaped focusing lens disposed on said locating block to face toward said backlight; and said hollow portion is disposed through said locating block and said arc-shaped focusing lens.

* * * * *